UNITED STATES PATENT OFFICE.

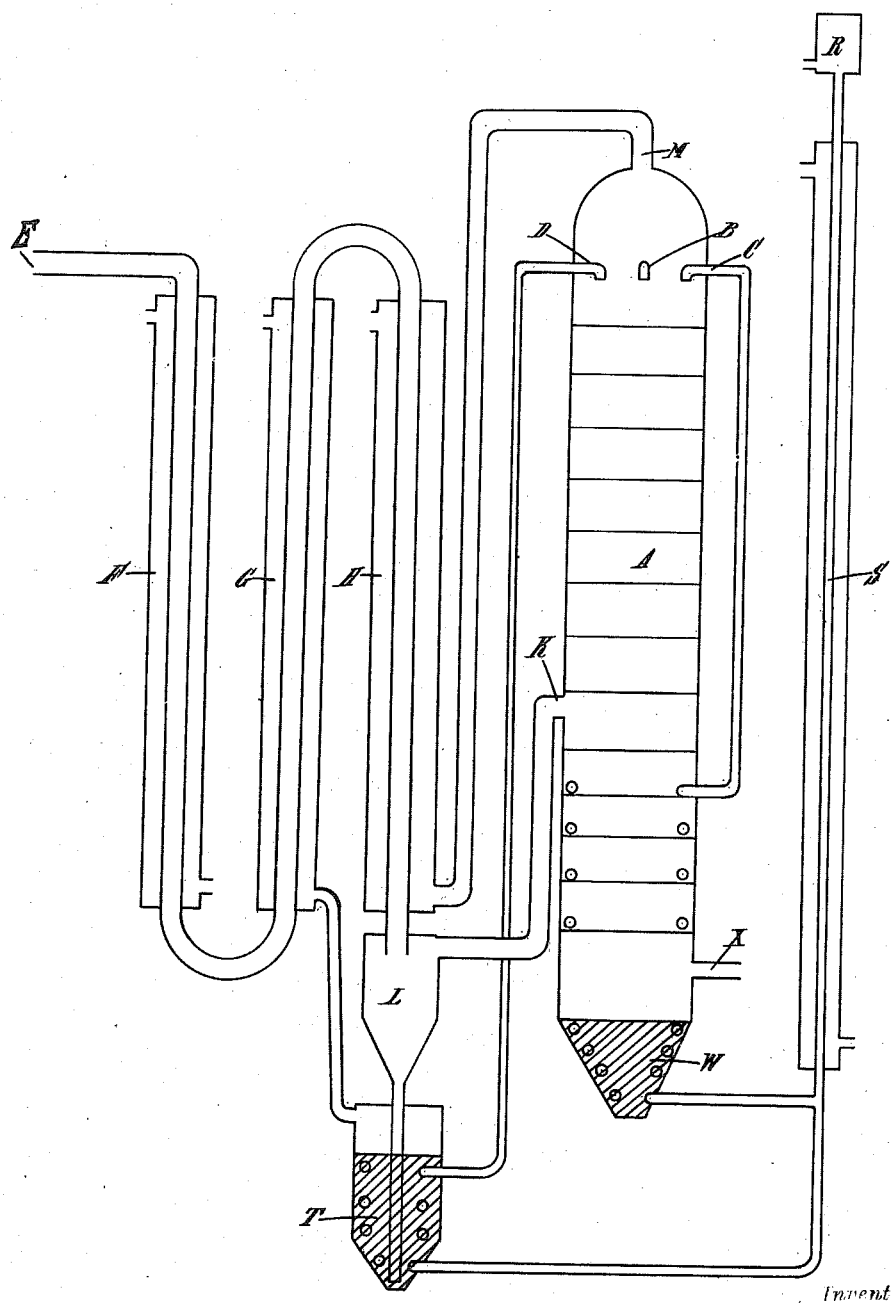

EDWARD BRADFORD MAXTED, OF WALSALL, ENGLAND.

MANUFACTURE OF A HYDROGEN-NITROGEN MIXTURE.

1,296,992.  Specification of Letters Patent.  Patented Mar. 11, 1919.

Application filed November 16, 1917. Serial No. 202,350.

*To all whom it may concern:*

Be it known that I, EDWARD BRADFORD MAXTED, a subject of the King of Great Britain, residing at 63 Highgate road, Walsall, in the county of Stafford, England, have invented certain new and useful Improvements in Manufacture of a Hydrogen-Nitrogen Mixture, of which the following is a specification.

For certain purposes such as for the synthetic production of ammonia, a nitrogen-hydrogen mixture, completely free from impurities and, in particular, from certain bodies such as carbon monoxid, sulfur compounds and arsenic compounds, which exert an inhibitive effect on the course of the synthesis, is required. This invention relates to the preparation of such a mixture from water gas, or from other commercial reducing gases consisting of, or containing as essential constituents, hydrogen and carbon monoxid, or from commercial reducing gases, in general consisting of, or containing as essential constituents, hydrogen and a second gas the boiling point of which lies above that of nitrogen. The commercial reducing gas of one of the above types may be treated by this process in the raw condition or it may, if it is a commercial reducing gas consisting of, or containing as essential constituents, hydrogen and a carbon compound such as carbon monoxid or methane, be subjected to a preliminary treatment with steam in the presence of a catalyst, such as iron oxid or a preparation containing this, at an elevated temperature in the known manner whereby it becomes enriched in hydrogen.

According to this invention the aforesaid mixture containing hydrogen and a second gas having a liquefaction temperature above that of nitrogen is subjected at a low temperature to the analyzing action of a current of liquid nitrogen.

In the following description of the invention the treatment of water gas is taken as an example.

This commercial reducing gas, containing as essential constituents carbon monoxid and hydrogen, together with carbon dioxid and other impurities, is freed from carbon dioxid and other less volatile constituents by compression on to water, by a chemical absorption or by cooling or by a suitable combination of these known methods. The gas, free, or almost free, from carbon dioxid, moisture and other less volatile constituents is now cooled by means of a heat interchanger or by other suitable means to a low temperature approximating to or lower than $-195°$ C. During the earlier stages of this cooling the last traces of carbon dioxid, water and other less volatile impurities separate out in solid or liquid form and can thus be readily removed by means of filters or liquid traps of any suitable pattern. During the cooling below $-195°$ C. a proportion of the carbon monoxid depending on the temperature and the composition of the gas may separate in a liquid form and be removed as such. The residual gas, resulting from the cooling, is passed at a temperature of $-195°$ C. or below into a separating column in which it is subjected to the analyzing action of a descending column of liquid nitrogen. In this column the carbon monoxid constituent of the hydrogen-carbon-monoxid mixture condenses and dissolves in the current of liquid nitrogen, this current of liquid nitrogen acting as a separating agent in such a way that the hydrogen component of the hydrogen-carbon monoxid mixture issues from the top of the column in a gaseous form free from carbon monoxid and mixed only with a certain amount of nitrogen. The liquid nitrogen-carbon monoxid mixture in its turn, on passing farther down the column, suffers a continuous fractionation by reason of increasing temperature, developed as explained later, and this fractionation may, if desired, be carried sufficiently far so that the liquid flowing from the bottom of the column, which is below the point of introduction of the gaseous carbon-monoxid-hydrogen mixture, consists of practically pure carbon monoxid.

All losses of cold are prevented as far as possible by means of a system of heat interchangers and by efficient insulation in the usual way.

Fresh liquid nitrogen for the separation of the hydrogen-carbon-monoxid mixture is obtained by the liquefaction of gaseous nitrogen supplied from outside or by reliquefying a part of the nitrogen contained in the nitrogen-hydrogen mixture produced. The liquefaction may be carried out by compression in indirect contact with the liquid in the lower part of the column or with the liquid carbon monoxid which separates out in the process of preliminary cooling, or in any other suitable way, and may form the source of heat by means of which the nitrogen-carbon-monoxid mixture in the lower part of the column, below the point of introduction of the hydrogen-carbon-monoxid mixture, is fractionated. It is supplemented by nitrogen liquefied by external power and supplied as required in order to compensate for losses of cold during working.

The above process differs essentially from all other processes for the separation of hydrogen-carbon-monoxid mixtures into their constituents in that the cooled gaseous hydrogen-carbon-monoxid mixture is subjected to the analyzing action of a descending column of a liquefied foreign gas, the boiling point of which lies between that of carbon monoxide and hydrogen.

The relative proportions of nitrogen and hydrogen in the mixture produced will vary with the composition of the gas passed into the separating column and with the conditions of separation. Should it not be, as such, suitable for the synthesis of ammonia, or for the purpose for which it is desired to use it, pure nitrogen or pure hydrogen may be added, as necessary, in order to bring the composition to that required.

We find moreover that for the manufacture of a hydrogen-nitrogen mixture, according to the method as above described, there may be employed as starting material, not only a gas mixture consisting of or containing hydrogen and carbon-monoxid, but also any gas consisting of or containing hydrogen together with a second gas, the liquefying point of which lies above that of nitrogen, for instance, a mixture consisting principally of hydrogen and methane, such as coal gas.

For the sake of clearness, however, I have described, as a typical example of my process, the treatment of a carbon-monoxid-hydrogen mixture only. Should another mixture, conforming to the conditions specified above, be employed, it is obvious that, in reading the description of the process here given, the name of the second gas in the mixture in question is to be read instead of carbon monoxid.

The disposition of a suitable apparatus in which the process may be carried out is shown diagrammatically in the figure hereto appended. It is however to be clearly understood that the invention is not confined to this or to any particular apparatus. The plant illustrated diagrammatically in the figure comprises the following parts:—

A is a separating column into which liquid nitrogen is introduced by means of the connections B, C and D.

The connection B carries liquid nitrogen produced by external work in sufficient quantity to compensate for losses of cold. The liquid nitrogen supplied from the connections C and D is obtained by compressing gaseous nitrogen by means of the compressor R and cooling the gas to an extent required by the working of the plant by means of a heat interchanger S, the compressed gas being liquefied in the closed coils contained in the lower part of the column A and in the liquid carbon monoxid reservoir T and brought, by means of the connections shown, to the top part of the column at C and D, the flow of liquid nitrogen on to the top plate of the column A being regulated as required by means of valves placed near C and D.

The incoming gas, from which the hydrogen-nitrogen mixture is to be produced, enters at E and passes through heat interchangers shown diagrammatically at F, G and H into the separating column at K. One or more of these heat interchangers, preferably F, may be cooled by means of a suitable frigorific machine.

Any carbon monoxid which separates out in the liquid form in the heat interchanger H collects in the chamber L from which it is run off and allowed to evaporate in T, the cold being used in the heat interchanger G. The hydrogen-nitrogen mixture emerges from the column A by way of the interchanger H, passes through its outer part to a gas holder, the cold being used for cooling purposes. The carbon-monoxid which remains in the gas upon entering the column at K is brought down by the descending current of liquid nitrogen into the lower part of the separating column as a liquid becoming continually richer in carbon monoxide and finally, passing into the collector W, is completely evaporated by the coils contained therein and passes as a gas from the opening X.

It is extremely important for the economical working of the plant that the issuing gases shall in every case, before emerging from the apparatus, have imparted their cold as far as possible to incoming gas, whether this be gas to be separated or nitrogen to be liquefied and used for the separation process as above described.

What I claim and desire to secure by Letters Patent of the United States is:—

1. The process for the manufacture of a hydrogen-nitrogen mixture, which consists in subjecting at a low temperature a gas mixture containing hydrogen and a second gas, the liquefaction temperature of which is above that of nitrogen, to the analyzing action of a current of liquid nitrogen, dissolving the said second gas in the liquid nitrogen and evaporating a portion of the nitrogen to mix with the gaseous hydrogen.

2. The process for the manufacture of a hydrogen-nitrogen mixture which consists in subjecting at a low temperature a gas mixture containing hydrogen and carbon monoxid to the analyzing action of a current of liquid nitrogen, dissolving the carbon-monoxid in the liquid nitrogen and evaporating a portion of the nitrogen to mix with the gaseous hydrogen.

3. The process for the manufacture of a hydrogen-nitrogen mixture which consists in passing at a low temperature a gas mixture containing hyrogen and a second gas the liquefaction temperature of which is above that of nitrogen through a separating column down which a current of liquid nitrogen is caused to flow, dissolving the said second gas in the liquid nitrogen in the lower part of the column and evaporating a portion of the nitrogen to mix with the gaseous hydrogen.

4. The process for the manufacture of a hydrogen-nitrogen mixture which consists in cooling to a temperature approximating to $-195°$ C. a gas mixture containing hydrogen and a second gas the liquefaction temperature of which is above that of nitrogen, passing the mixture at about the said temperature into a separating column through which a current of liquid nitrogen is caused to flow, dissolving the said second gas in the liquid nitrogen and evaporating a portion of the nitrogen to mix with the gaseous hydrogen.

5. The process for the manufacture of a hydrogen-nitrogen mixture which consists in subjecting at a low temperature a gas mixture containing hydrogen and a second gas the liquefaction temperature of which is above that of nitrogen to a cooling action which causes liquefaction of part of the second gas, passing the cooled mixture into a separating chamber, subjecting it to the analyzing action of a current of liquid nitrogen, part of which is liquefied by pressure under the cooling action of the liquefied portion of the said second gas, dissolving the said second gas in the liquid nitrogen and evaporating a portion of the nitrogen to mix with the gaseous hydrogen.

EDWARD BRADFORD MAXTED.